US012643066B2

(12) United States Patent  
McConnell et al.

(10) Patent No.: US 12,643,066 B2  
(45) Date of Patent: Jun. 2, 2026

(54) ACTIVE PRECLEANER SYSTEM AND METHODS OF USE

(71) Applicant: Donaldson Company, Inc., Bloomington, MN (US)

(72) Inventors: Jason P. McConnell, Minneapolis, MN (US); John R.L. Numrich, St. Louis Park, MN (US); Nathan D. Neudecker, Minneapolis, MN (US); David J. Burton, Bloomington, MN (US); Anthonius Jan-Baptist Maria Moers, Holsbeek (BE); Tim Billiau, Bierbeek (BE); Kristof Decoster, Vilvoorde (BE); Sergey Bondarenko, Brussels (BE); Gwenole Stouthuysen, Glabbeek (BE)

(73) Assignee: Donaldson Company, Inc., Bloomington, MN (US)

( * ) Notice: Subject to any disclaimer, the term of this patent is extended or adjusted under 35 U.S.C. 154(b) by 395 days.

(21) Appl. No.: 17/913,011

(22) PCT Filed: Mar. 19, 2021

(86) PCT No.: PCT/US2021/023321  
§ 371 (c)(1),  
(2) Date: Sep. 20, 2022

(87) PCT Pub. No.: WO2021/188998  
PCT Pub. Date: Sep. 23, 2021

(65) Prior Publication Data

US 2023/0062732 A1 Mar. 2, 2023

Related U.S. Application Data

(60) Provisional application No. 62/992,834, filed on Mar. 20, 2020.

(51) Int. Cl.  
B01D 46/52 (2006.01)  
B01D 46/24 (2006.01)  
(Continued)

(52) U.S. Cl.  
CPC ........ B01D 46/527 (2013.01); B01D 46/2411 (2013.01); B01D 46/446 (2013.01);  
(Continued)

(58) Field of Classification Search  
CPC ...... B01D 50/20; B01D 46/446; B01D 46/48; B01D 46/52–528; F02M 35/0216;  
(Continued)

(56) References Cited

U.S. PATENT DOCUMENTS 3,411,272 A 11/1968 Carmon  
3,449,891 A 6/1969 Shohet et al.  
(Continued)

FOREIGN PATENT DOCUMENTS

CN 101990467 3/2011  
CN 106640440 5/2017  
(Continued)

OTHER PUBLICATIONS

International Search Report and Written Opinion for PCT/US2021/023321 (Jul. 2, 2021).

*Primary Examiner* — Robert Clemente  
(74) *Attorney, Agent, or Firm* — Merchant & Gould P.C.

(57) ABSTRACT

An air cleaner assembly for filtering intake air for a power plant can include a filter cartridge disposed within a housing of the air cleaner assembly, a precleaner assembly including at least one particle separator for separating particulates from an airflow stream and a scavenge port for discharging the separated particulates, the precleaner assembly being located upstream of the filter cartridge, a scavenge system for evacuating the separated particulates out of the scavenge  
(Continued)

port, the scavenge system including an electric motor coupled to an fan, an input sensor generating an input signal relating to a parameter associated with one or more of the precleaner assembly, the air cleaner assembly, a power plant receiving air from the air cleaner assembly, and a vehicle associated with the power plant, and a controller for operating the speed of the scavenge system based on the input signal from the input sensor.

17 Claims, 13 Drawing Sheets

(51) Int. Cl.

| | |
|---|---|
| *B01D 46/44* | (2006.01) |
| *B01D 46/48* | (2006.01) |
| *B01D 50/20* | (2022.01) |
| *F02M 35/02* | (2006.01) |
| *F02M 35/08* | (2006.01) |
| *F02M 35/09* | (2006.01) |
| *F02M 35/10* | (2006.01) |

(52) U.S. Cl.
CPC ............. *B01D 46/48* (2013.01); *B01D 50/20* (2022.01); *F02M 35/0208* (2013.01); *F02M 35/0216* (2013.01); *F02M 35/084* (2013.01); *F02M 35/09* (2013.01); *F02M 35/1038* (2013.01); *B01D 2279/60* (2013.01)

(58) Field of Classification Search
CPC ............. F02M 35/022; F02M 35/0223; F02M 35/0226; F02M 35/084
See application file for complete search history.

(56) References Cited

U.S. PATENT DOCUMENTS

| | | | |
|---|---|---|---|
| 3,483,676 | A | 12/1969 | Sargisson |
| 3,915,679 | A * | 10/1975 | Roach ........................ B04C 3/06 |
| | | | 55/423 |
| 4,006,000 | A * | 2/1977 | Tortorici .............. F02M 35/084 |
| | | | 55/482 |
| 4,242,115 | A | 12/1980 | Harold et al. |
| 4,304,094 | A | 12/1981 | Amelio |
| 4,348,057 | A | 9/1982 | Parenti et al. |
| 4,514,193 | A | 4/1985 | Booth |
| 4,746,340 | A * | 5/1988 | Durre ..................... B01D 45/12 |
| | | | 55/347 |
| 5,472,463 | A | 12/1995 | Herman et al. |
| 5,480,464 | A * | 1/1996 | De Villiers .......... F02M 35/022 |
| | | | 55/320 |
| 5,755,842 | A * | 5/1998 | Patel .................. B01D 46/0005 |
| | | | 55/330 |
| 5,772,883 | A | 6/1998 | Rothman et al. |
| D396,098 | S | 7/1998 | Gillingham et al. |
| 5,792,247 | A | 8/1998 | Gillingham et al. |
| D398,046 | S | 9/1998 | Gillingham et al. |
| D399,944 | S | 10/1998 | Gillingham et al. |
| 5,820,646 | A | 10/1998 | Gillingham et al. |
| 5,895,574 | A | 4/1999 | Friedmann et al. |
| 5,902,364 | A | 5/1999 | Tokar et al. |
| D428,128 | S | 7/2000 | Gillingham et al. |
| 6,179,890 | B1 | 1/2001 | Ramos et al. |
| D437,401 | S | 2/2001 | Ramos et al. |
| 6,190,432 | B1 | 2/2001 | Gieseke et al. |
| 6,210,469 | B1 | 4/2001 | Tokar |
| 6,235,195 | B1 | 5/2001 | Tokar |
| 6,350,296 | B1 | 2/2002 | Warner |
| 6,591,820 | B2 | 7/2003 | Kitano et al. |
| 7,802,433 | B2 | 9/2010 | Higgins |
| 8,555,827 | B2 | 10/2013 | Schleiden |
| 8,641,792 | B2 | 2/2014 | Vladaj et al. |
| 9,719,352 | B2 | 8/2017 | Sheoran et al. |
| 10,100,734 | B2 | 10/2018 | Sheoran et al. |
| 2007/0289265 | A1 * | 12/2007 | Coulonvaux ........ B01D 46/525 |
| | | | 55/324 |
| 2008/0028940 | A1 | 2/2008 | Han et al. |
| 2010/0086446 | A1 | 4/2010 | Matsunaga et al. |
| 2010/0306955 | A1 | 12/2010 | Menrik et al. |
| 2011/0030629 | A1 | 2/2011 | Schleiden |
| 2011/0072769 | A1 | 3/2011 | Madaj et al. |
| 2011/0162354 | A1 | 7/2011 | Hayashi et al. |
| 2011/0277441 | A1 | 11/2011 | Ayshford |
| 2013/0092798 | A1 | 4/2013 | Boyce |
| 2013/0239802 | A1 | 9/2013 | Troxell |
| 2013/0263406 | A1 | 10/2013 | Amisani et al. |
| 2014/0123621 | A1 | 5/2014 | Driessens et al. |
| 2015/0033681 | A1 | 2/2015 | Santini et al. |
| 2015/0114221 | A1 | 4/2015 | Ekanayake et al. |
| 2015/0176545 | A1 | 6/2015 | Troxell et al. |
| 2015/0275831 | A1 | 10/2015 | Chlystek et al. |
| 2015/0345439 | A1 | 12/2015 | Gomez et al. |
| 2016/0138507 | A1 | 5/2016 | Klassen et al. |
| 2016/0160815 | A1 | 6/2016 | Martin et al. |
| 2016/0245176 | A1 | 8/2016 | Sheoran et al. |
| 2017/0203241 | A1 | 7/2017 | Subedi et al. |
| 2017/0204816 | A1 * | 7/2017 | Meyer ............... F02M 35/0216 |
| 2017/0340996 | A1 | 11/2017 | Jo et al. |
| 2018/0328320 | A1 | 11/2018 | Lecuelle |
| 2019/0001250 | A1 | 1/2019 | Moredock et al. |
| 2019/0255476 | A1 | 8/2019 | Silvestro et al. |
| 2020/0121146 | A1 | 4/2020 | Ohlendorf |
| 2020/0141338 | A1 | 5/2020 | Green |
| 2020/0206664 | A1 | 7/2020 | Subedi et al. |
| 2020/0269182 | A1 | 8/2020 | Gustavsson et al. |
| 2020/0318585 | A1 | 10/2020 | Herman et al. |
| 2020/0368664 | A1 | 11/2020 | Kroeger et al. |
| 2022/0034245 | A1 | 2/2022 | Wang et al. |
| 2022/0161177 | A1 * | 5/2022 | Little .................... B01D 46/44 |

FOREIGN PATENT DOCUMENTS

| | | |
|---|---|---|
| CN | 109404177 | 3/2019 |
| EP | 0452373 | 10/1994 |
| EP | 3401539 A1 | 11/2018 |
| FR | 2767872 | 3/1999 |
| FR | 2995632 | 3/2014 |
| JP | 2005163597 | 6/2005 |
| JP | 2007211605 | 8/2007 |
| KR | 101937092 B1 | 1/2019 |
| WO | 2005077487 | 8/2005 |
| WO | 2014210534 | 12/2014 |
| WO | 2016105560 | 6/2016 |

* cited by examiner

FIG. 4

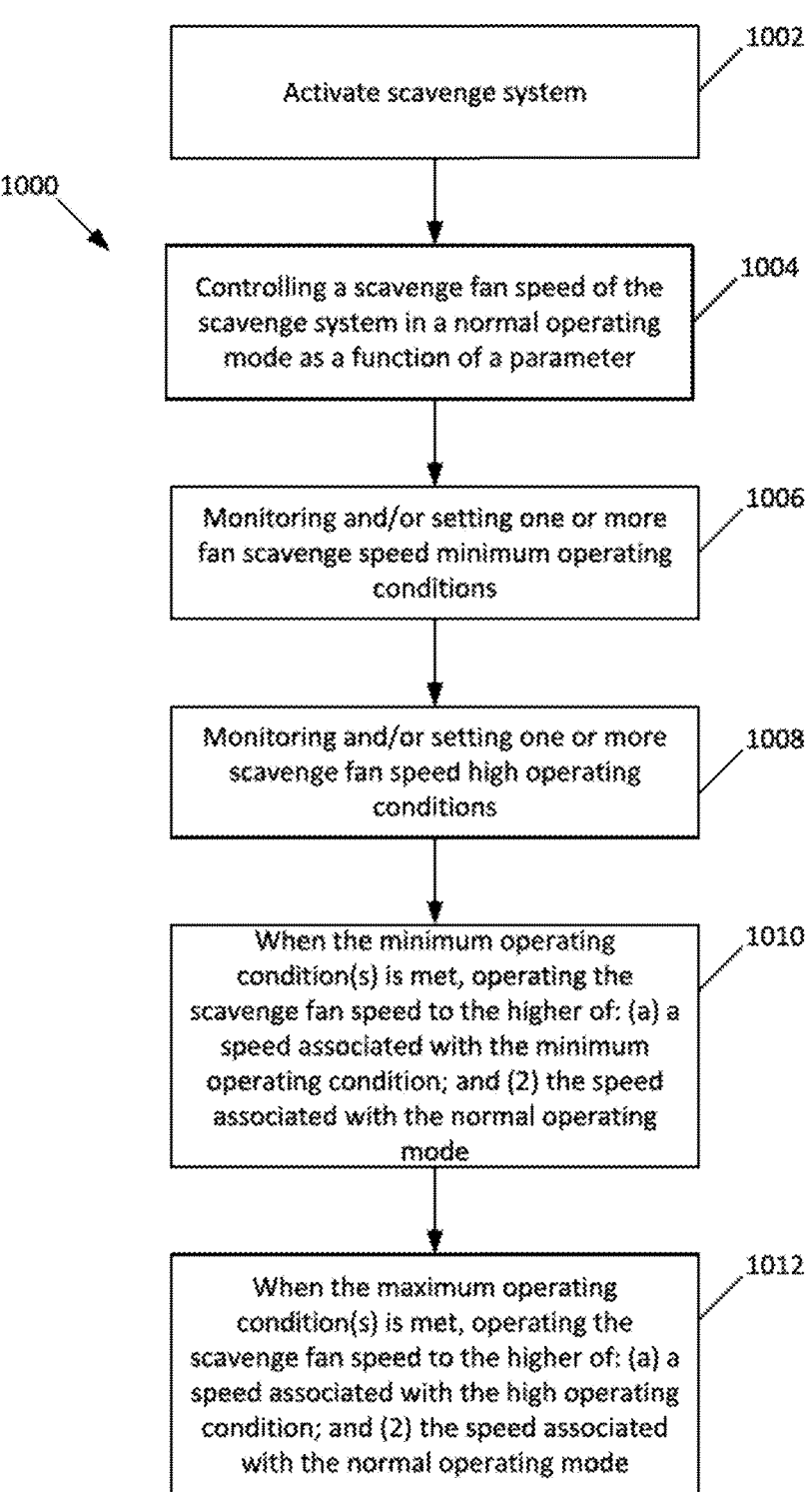

OVERALL CONTROL

1002 — Activate scavenge system

1000

1004 — Controlling a scavenge fan speed of the scavenge system in a normal operating mode as a function of a parameter 1006 — Monitoring and/or setting one or more fan scavenge speed minimum operating conditions 1008 — Monitoring and/or setting one or more scavenge fan speed high operating conditions 1010 — When the minimum operating condition(s) is met, operating the scavenge fan speed to the higher of: (a) a speed associated with the minimum operating condition; and (2) the speed associated with the normal operating mode 1012 — When the maximum operating condition(s) is met, operating the scavenge fan speed to the higher of: (a) a speed associated with the high operating condition; and (2) the speed associated with the normal operating mode

NORMAL OPERATING CONDITION

Monitor a parameter of the system                                    1102

1100

Determine a setpoint value associated
with the parameter                                                   1104

Output a control signal to the scavenge
fan motor to meet the setpoint                                       1106

FIG. 6

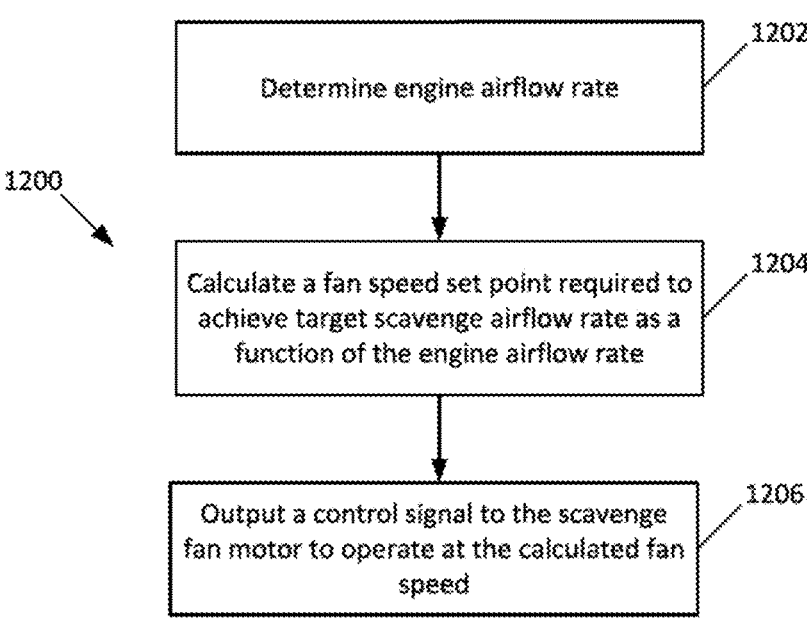

NORMAL OPERATING CONDITION - Example

| | |
|---|---|
| Determine engine airflow rate | 1202 |

1200

| | |
|---|---|
| Calculate a fan speed set point required to achieve target scavenge airflow rate as a function of the engine airflow rate | 1204 |

| | |
|---|---|
| Output a control signal to the scavenge fan motor to operate at the calculated fan speed | 1206 |

FIG. 7

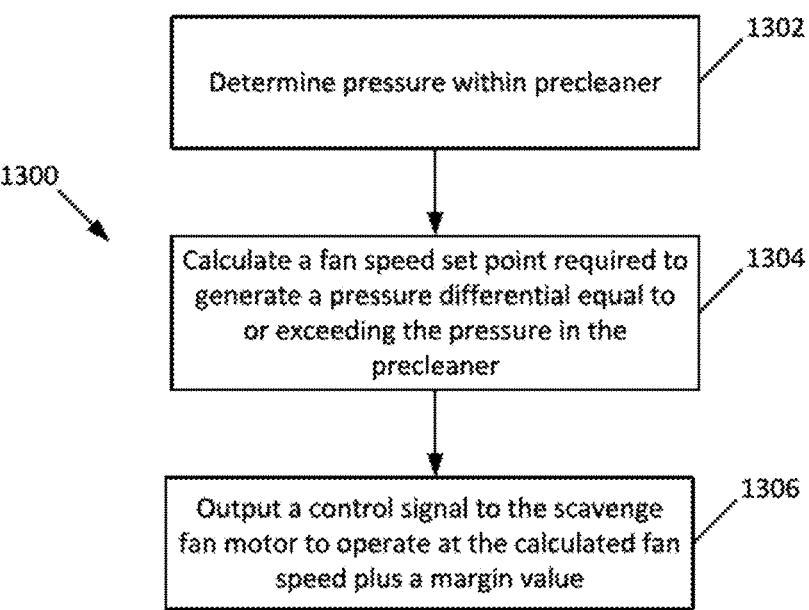

NORMAL OPERATING CONDITION - Example

| | |
|---|---|
| Determine pressure within precleaner | 1302 |

1300

| | |
|---|---|
| Calculate a fan speed set point required to generate a pressure differential equal to or exceeding the pressure in the precleaner | 1304 |

| | |
|---|---|
| Output a control signal to the scavenge fan motor to operate at the calculated fan speed plus a margin value | 1306 |

FIG. 8

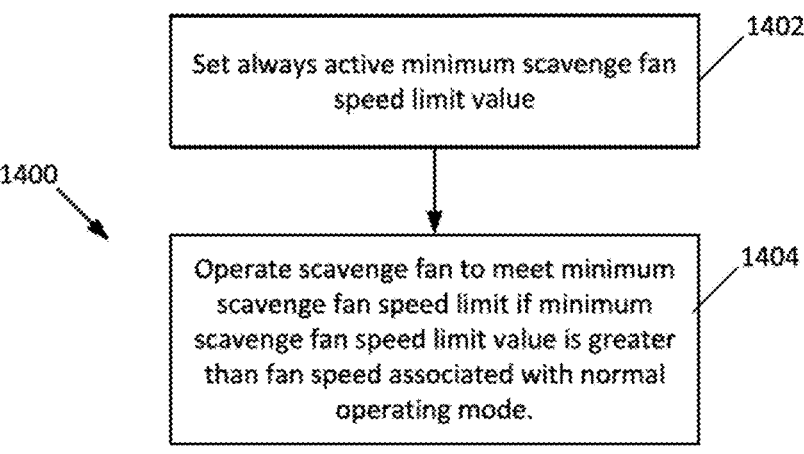

MINIMUM OPERATING CONDITION #1

1400

Set always active minimum scavenge fan speed limit value — 1402

Operate scavenge fan to meet minimum scavenge fan speed limit if minimum scavenge fan speed limit value is greater than fan speed associated with normal operating mode. — 1404

FIG. 9

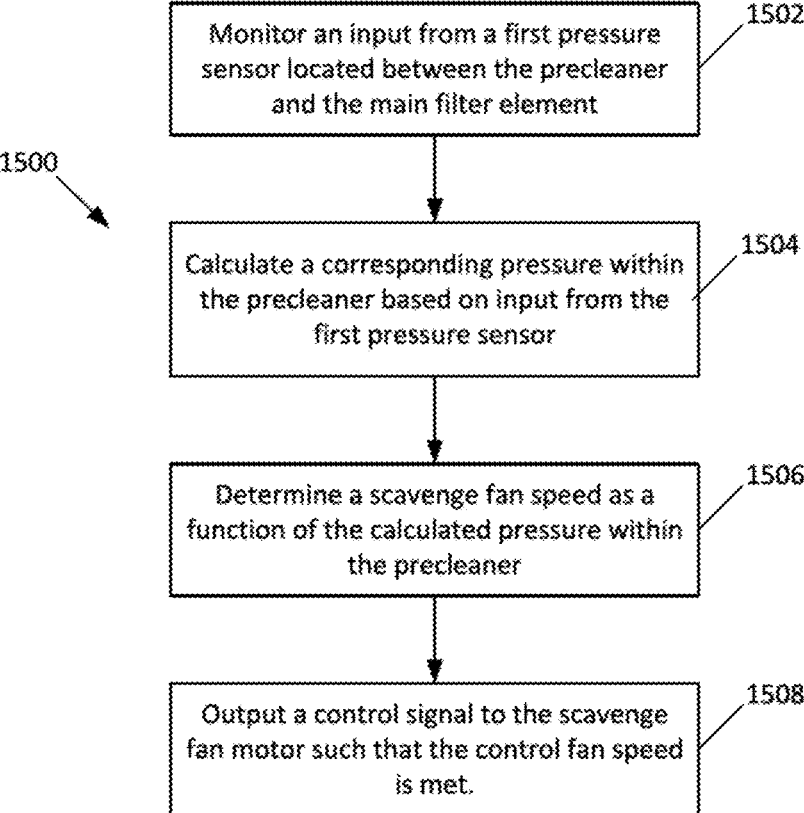

MINIMUM OPERATING CONDITION #2

1500

Monitor an input from a first pressure sensor located between the precleaner and the main filter element — 1502

Calculate a corresponding pressure within the precleaner based on input from the first pressure sensor — 1504

Determine a scavenge fan speed as a function of the calculated pressure within the precleaner — 1506

Output a control signal to the scavenge fan motor such that the control fan speed is met. — 1508

HIGH OPERATING CONDITION #1

Monitor an input from a first pressure sensor located between the precleaner and the main filter element — 1602

1600

Compare first pressure sensor input to a threshold value — 1604

Output a control signal to the scavenge fan motor to operate the scavenge fan motor at a maximum speed. — 1606

Generate scavenge fan / precleaner service signal. — 1608

ACTIVE PRECLEANER SYSTEM AND METHODS OF USE

This application is a National Stage Application of PCT/US2021/023321, filed Mar. 19, 2021, which claims benefit of priority to U.S. Provisional Patent Application No. 62/992,834, filed Mar. 20, 2020, and which applications are incorporated herein by reference. To the extent appropriate, a claim of priority is made to each of the above disclosed applications.

TECHNICAL FIELD

The present invention relates to filter arrangements, typically for use in filtering air, such as intake air for internal combustion engines, and more particularly relates to filter assemblies that include multiple components arranged in a housing to provide desired filtering capabilities.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example, on a vehicle, the filter media is contained in a removable and replaceable, i.e. serviceable, component, typically referred as a filter element or cartridge. In some applications, particularly where a machine operates in a harsh environment, a precleaner assembly can be utilized to remove relatively large contaminants from the airflow stream in order to extend the life of the filter media.

SUMMARY

An air cleaner assembly for filtering intake air for a power plant can include a filter cartridge disposed within a housing of the air cleaner assembly, a precleaner assembly including at least one particle separator for separating particulates from an airflow stream and a scavenge port for discharging the separated particulates, the precleaner assembly being located upstream of the filter cartridge, a scavenge system for evacuating the separated particulates out of the scavenge port, the scavenge system including an electric motor coupled to an fan, an input sensor generating an input signal relating to a parameter associated with one or more of the precleaner assembly, the air cleaner assembly, a power plant receiving air from the air cleaner assembly, and a vehicle associated with the power plant, and a controller for operating the speed of the scavenge system based on the input signal from the input sensor.

In some examples, the operational parameter is one or more of a sensed dust condition in the airflow stream, a GPS position location of the vehicle, a sensed pressure drop of the airflow stream across the precleaner assembly, a dust-removal efficiency of the precleaner assembly, and an airflow volume of the airflow stream passing through the precleaner assembly.

In some examples, the controller commands the scavenge system to deactivate when a threshold value of the operational parameter is exceeded.

In some examples, the controller receives at least one input for controlling the speed of the scavenge system, wherein the at least one input signal corresponds to one or more of vehicle speed, engine speed, engine load, an operator input, vehicle location, pressure drop across a filter element, mass air flow rate through the precleaner assembly, presence of moisture or water, vehicle or engine vibration, filter change frequency or number of filter changes, filter identity, and engine or vehicle identity.

A method of operating a scavenge system for an air cleaner assembly can includes providing a filter cartridge within a housing of the air cleaner assembly, providing a precleaner assembly including at least one particle separator for separating particulates from an airflow stream and a scavenge port for discharging the separated particulates, the precleaner assembly being located upstream of the filter cartridge, providing a scavenge system for evacuating the separated particulates out of the scavenge port, receiving, at a controller, at least one input signal relating to a parameter associated with one or more of the precleaner assembly, the air cleaner assembly, a power plant receiving air from the air cleaner assembly, and a vehicle associated with the power plant, and operating the speed of the scavenge system with the controller, based on the at least one input. The method can further include operating the speed of the scavenge system to ensure that a pressure across the scavenge system at least equals a pressure within the precleaner.

In some examples, the input signal parameter is one or more of a sensed dust condition in the airflow stream, a GPS position location of the vehicle, a sensed pressure drop of the airflow stream across the precleaner assembly, a dust-removal efficiency of the precleaner assembly, and an airflow volume of the airflow stream passing through the precleaner assembly.

In some examples, the input signal parameter includes a vehicle location input, wherein the controller operates the scavenge system when the vehicle location input corresponds to a location inside or outside of a predetermined geographic area.

In some examples, the input includes one or more of a vehicle speed, a vehicle engine speed, and a vehicle engine load input, wherein the controller operates the scavenge system when the one or more of a vehicle speed, a vehicle engine speed, and a vehicle engine load exceeds or falls below a predetermined threshold.

In some examples, the input includes an input corresponding to one or both of an air pressure drop across the precleaner assembly and the filter element, wherein the controller operates the scavenge system when the air pressure drop exceeds or falls below a predetermined threshold.

In some examples, the input includes an input corresponding to one or both of an acoustic input and a vibration input, wherein the controller operates the scavenge system when the acoustic input or vibration input exceeds or falls below a predetermined threshold.

In some examples, the input includes an input corresponding to one or both of a change or cleaning frequency of the filter element and a total number of filter element changes, wherein the controller operates the scavenge system when the change or cleaning frequency input or the total number of filter element changes input exceeds or falls below a predetermined threshold.

In some examples, the input includes an input corresponding to one or more of an identity of the filter element, an identity of the engine, and an identity of the vehicle, wherein the controller operates the scavenge system based on the identity of one or more of the filter element, engine, and the vehicle.

In some examples, the input includes an input corresponding to one or both of an air flow rate through the precleaner assembly and an airflow rate through the filter element, wherein the controller operates the scavenge system when the air flow rate exceeds or falls below a predetermined threshold.

In some examples, the input includes a weather condition parameter identified through data received from a weather service, wherein the controller operates the scavenge system when the weather condition parameter exceeds or falls below a predetermined threshold.

In some examples, the method further includes sending a speed signal output to the scavenge system motor and receiving a speed signal input from the scavenge system motor, and generating an output service signal where the difference between the speed signal input and the speed signal output exceeds a threshold value.

In some examples, the method further includes operating the scavenge system with one or both of a minimum operating condition and a high operating condition, wherein the controller overrides the output to the scavenge fan motor to a different speed when parameters associated with either of the minimum and the high operating conditions are met.

An air cleaner assembly for filtering intake air for a power plant can include a filter cartridge disposed within a housing of the air cleaner assembly; a precleaner assembly including at least one particle separator for separating particulates from an airflow stream and a scavenge port for discharging the separated particulates, the precleaner assembly being located upstream of the filter cartridge; a scavenge system for evacuating the separated particulates out of the scavenge port, the scavenge system including an electric motor coupled to an fan; and a control system operating the speed of the electric motor such that a differential pressure across the scavenge system is at least equal to or greater than a pressure within the precleaner.

In some examples, the air cleaner can include a first pressure sensor arranged to sense a pressure between the precleaner and the filter cartridge, wherein the controller receives an input from the first pressure sensor and sends an output signal to the scavenge system motor based on the input.

In some examples, the controller determines the pressure within the precleaner based on the sensed pressure at the first pressure sensor.

In some examples, the controller includes a transfer function for determining the pressure within the precleaner based on the sensed pressure at the first pressure sensor.

In some examples, the transfer function includes a first correlation between an air mass flow rate through the precleaner and the pressure within the precleaner and a second correlation between the air mass flow rate through the precleaner and the pressure between the precleaner and the filter cartridge.

In some examples, the air cleaner further includes a second pressure sensor arranged to sense the pressure within the precleaner and providing an input to the controller.

In some examples, the controller operates the scavenge system motor at a maximum operational speed when the pressure sensed at the first pressure sensor exceeds a threshold value.

In some examples, when the pressure sensed at the first pressure sensor exceeds the threshold value, the controller sends an output service signal associated with the precleaner assembly.

In some examples, the output signal to the scavenge system motor is a rotational speed control signal.

In some examples, the rotational speed control signal is a pulse-width-modulating (PWM) signal.

In some examples, the control system includes a first map correlating the PWM signal to the pressure drop across the scavenge system.

In some examples, the control system includes one or more pressure mapping curves correlating a scavenge fan PWM signal, a flow rate through the scavenge system, and a pressure signal at the first pressure sensor.

In some examples, the control system includes a transfer function generating the scavenge system motor speed output PWM signal from the first pressure sensor input, wherein the transfer function is derived from the first map and the one or more pressure mapping curves.

In some examples, the control system includes a minimum rotational speed set point value below which the scavenge system motor is not operated.

An air cleaner assembly for filtering intake air for a power plant can include a filter cartridge disposed within a housing of the air cleaner assembly; a precleaner assembly including at least one particle separator for separating particulates from an airflow stream and a scavenge port for discharging the separated particulates, the precleaner assembly being located upstream of the filter cartridge; a scavenge system for evacuating the separated particulates out of the scavenge port, the scavenge system including an motor coupled to an fan; and a control system including a controller sending a speed signal output to the scavenge system motor and receiving a speed signal input from the scavenge system motor, wherein the controller generates an output service signal where the difference between the speed signal input and the speed signal output exceeds a threshold value.

In some examples, the controller operates the scavenge system motor speed as a function of an input signal relating to one or more operational parameters associated with the precleaner assembly, the air cleaner assembly, a power plant receiving air from the air cleaner assembly, and/or a vehicle associated with the power plant.

An air cleaner can include a filter cartridge disposed within a housing of the air cleaner assembly; a precleaner assembly including at least one particle separator for separating particulates from an airflow stream and a scavenge port for discharging the separated particulates, the precleaner assembly being located upstream of the filter cartridge; a scavenge system for evacuating the separated particulates out of the scavenge port, the scavenge system including an motor coupled to an fan; and a controller varying a speed of the scavenge system motor in a normal operating mode in which the speed is a function of an input signal relating to one or more operational parameters associated with the precleaner assembly, the air cleaner assembly, a power plant receiving air from the air cleaner assembly, and/or a vehicle associated with the power plant; wherein the controller includes one or both of a minimum operating condition and a high operating condition, wherein the controller overrides the output to the scavenge fan motor to a different speed when parameters associated with either of the minimum and the high operating conditions are met.

In some examples, the minimum operating condition includes a parameter associated with a minimum pressure within the precleaner.

In some examples, the minimum operating condition includes a parameter associated with a minimum rotational speed setpoint of the scavenge fan motor.

In some examples, the high operating condition includes a parameter associated with a maximum pressure within the precleaner.

BRIEF DESCRIPTION OF THE DRAWINGS

The present invention will be further explained with reference to the appended Figures, wherein like structure is referred to by like numerals throughout the several views, and wherein;

FIG. 4 is a diagram showing a control process of the control system shown in FIG. 1.

FIG. 6 is a diagram showing an example of the normal operating condition shown in FIG. 5.

FIG. 7 is a diagram showing an example of the normal operating condition shown in FIG. 5.

FIG. 8 is a diagram showing an example minimum operating condition of the control process shown at FIG. 4.

FIG. 9 is a diagram showing an example minimum operating condition of the control process shown at FIG. 4.

DETAILED DESCRIPTION

Herein, example filter assemblies, filter cartridges, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

Figure 1:
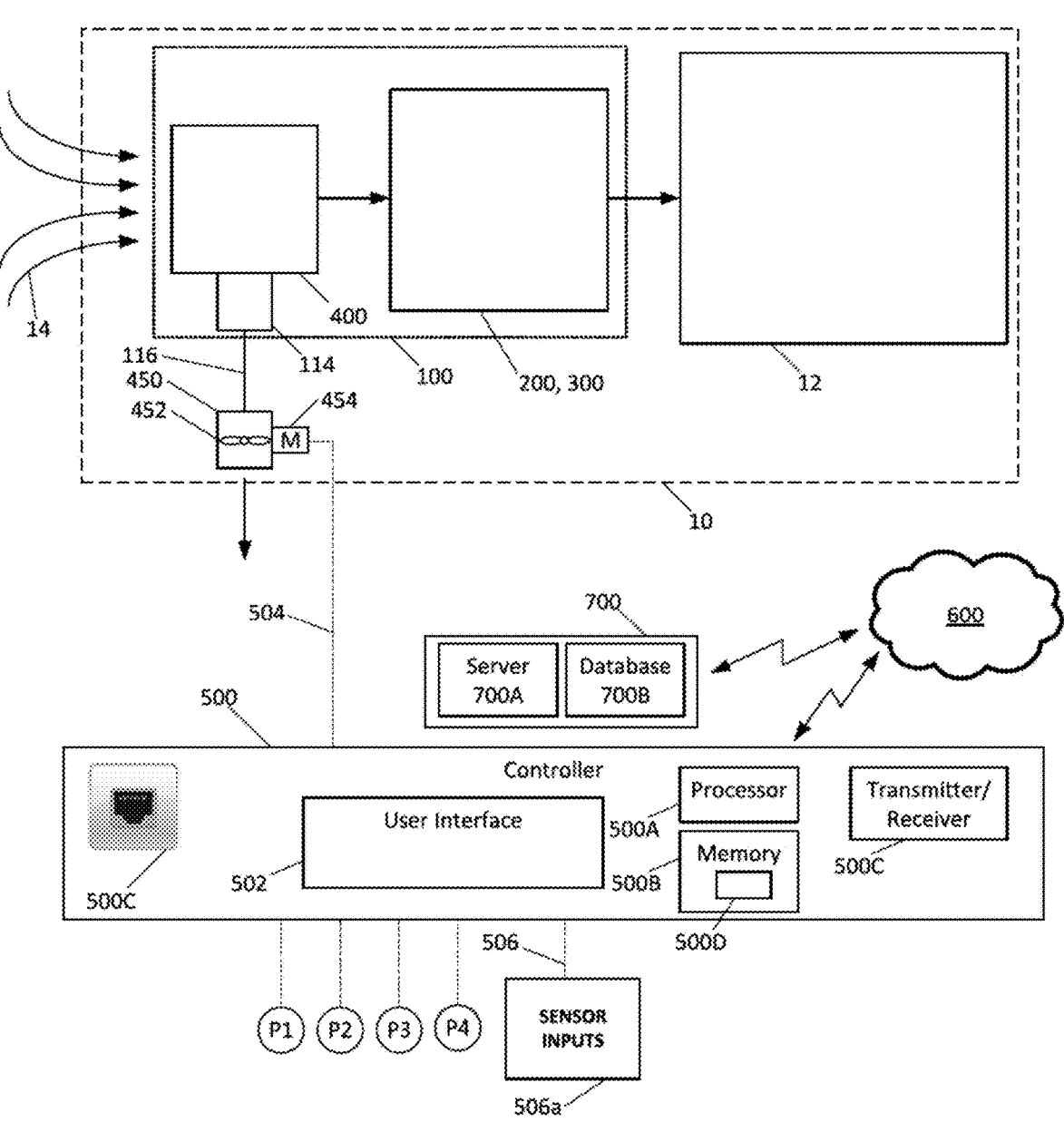
FIG. 1 is a schematic of a system including an air cleaner assembly, scavenge system, and a control system having features in accordance with the present disclosure.

Referring to FIG. 1, a system including an air cleaner assembly 100, a scavenge system 450, and a control system 500 is schematically presented. As depicted, the air cleaner assembly 100 includes a precleaner 400 and filter cartridges 200, 300 which sequentially remove particulates from an airflow 14 such that clean air can be delivered to an air-consuming device 12, such as an internal combustion engine or compressor. The scavenge system 450 operates to remove the separated particulates from the air cleaner assembly 100. The air cleaner assembly 100, scavenge system 450, and control system 500 are described in further detail in the following paragraphs.

Figure 2:
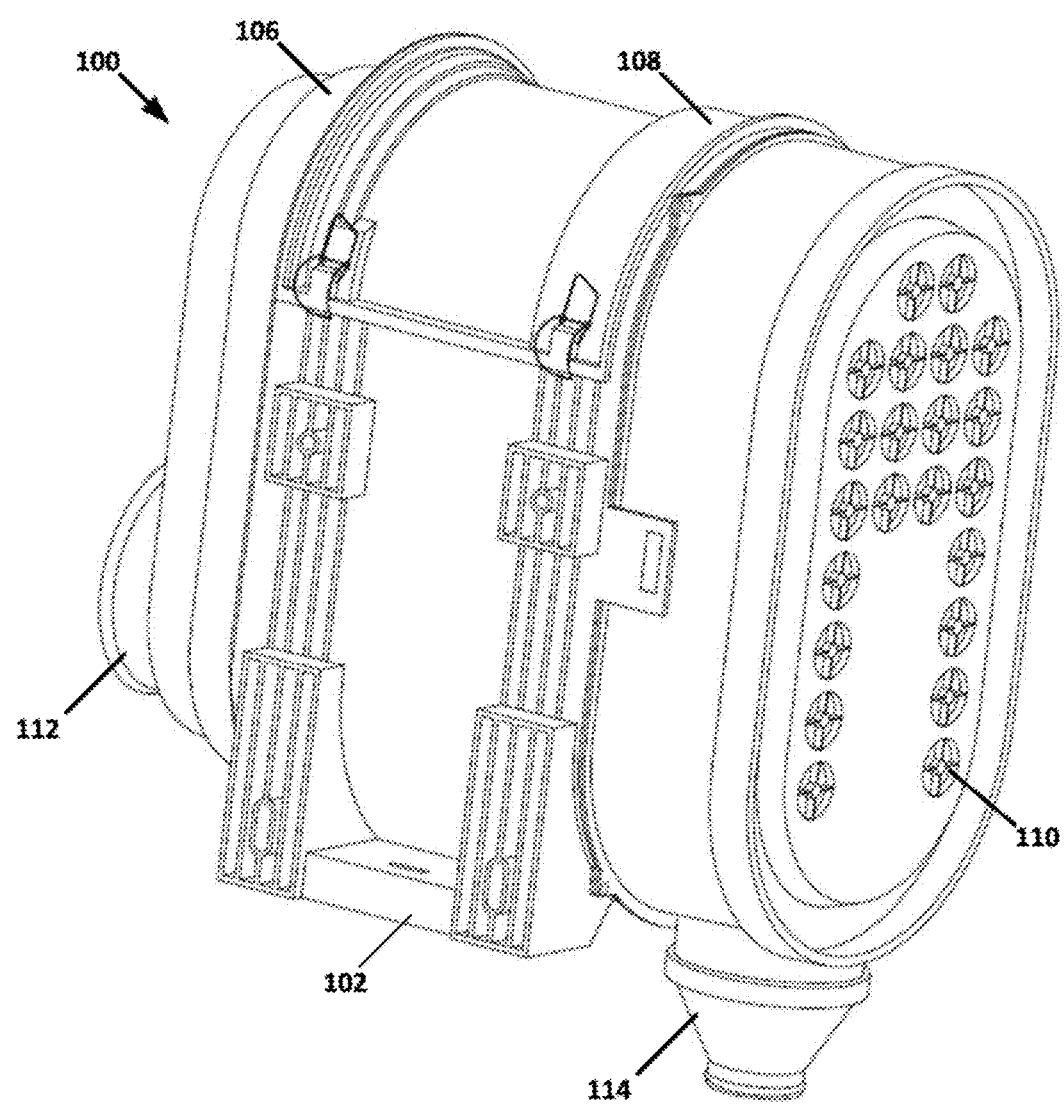
FIG. 2 is a schematic perspective view of an example air cleaner assembly usable with the system shown in FIG. 1.
Figure 3:
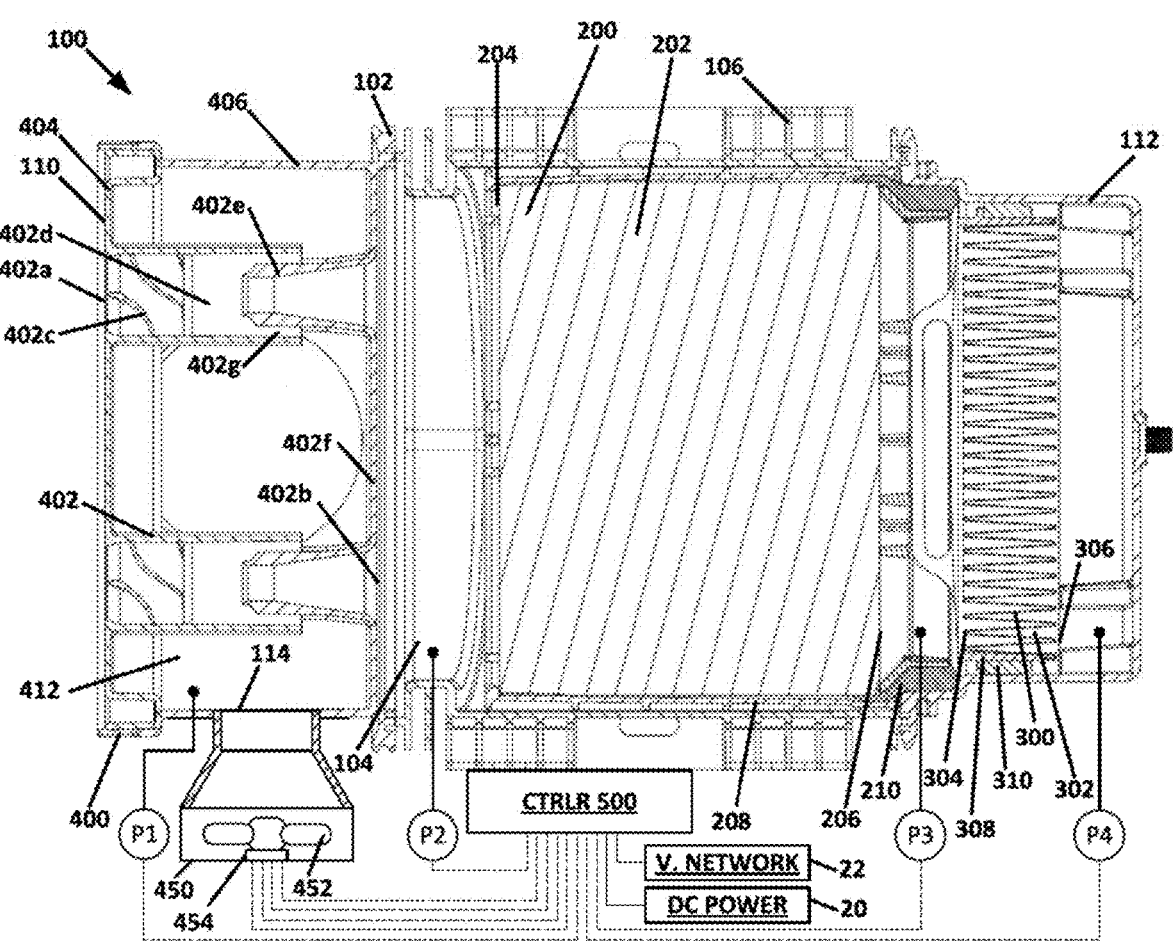
FIG. 3 is a schematic cross-sectional view of the air cleaner assembly shown in FIG. 2.

Referring to FIGS. 2 and 3, an air cleaner assembly 100 is presented. In one aspect, the air cleaner assembly 100 includes a housing 102 defining an interior cavity 104. The housing 102 can be configured as a main housing 106 and a cover 108 that allow for the interior cavity 104 to be accessed when the cover 108 is removed from the housing 106. The cover 108 can be secured to the housing 108 using any number of methods or approaches known in the art, for example by over-center latches, interacting lugs, and the like. In one aspect, the housing 102 includes an inlet 110 for accepting raw, untreated air and an outlet 112 for discharging clean, filtered air.

Referring to FIG. 3, a first filter cartridge 200, a second filter cartridge 300, and a precleaner assembly 400 are shown within the internal cavity 104 of the housing 102. These components collectively convert the unfiltered air received at the inlet 110 to the clean, filtered air delivered to the outlet 112.

In one aspect, the first filter cartridge 200 is generally positionable between the precleaner assembly 400 and the second filter cartridge 300. In a typical arrangement, the first filter cartridge 200 is removably positioned within the air cleaner assembly interior cavity 104, and would typically be considered to be a service component that is removable and replaceable, as desired and/or necessary. In one aspect, the first filter cartridge 200 includes a media pack 202 having an inlet flow face 204 for receiving pre-cleaned air from the precleaner assembly 400 and an outlet flow face 206 for delivering filtered air. In the example shown, the media pack 202 has an obround or racetrack cross-sectional shape. However, other shapes are possible, such as round, oval, and rectangular cross-sectional shapes. In one aspect, the media pack 202 defines an outer perimeter 208 extending between the inlet and outlet flow faces 204, 206. In the example shown, the media pack 202 is formed from a coiled media construction, for example a media construction having a fluted (typically corrugated) media sheet and a facing media sheet that together define parallel flutes to form a fluted or z-filter media construction. Suitable media constructions for the media pack 202 are discussed in more detail in the Media Types and Configurations section. In one aspect, the filter cartridge 200 includes a seal member 210 which forms a seal against an interior surface of the housing 102 such that all air passing through the interior cavity must pass through the media pack 202.

In one aspect, the second filter cartridge 300 is generally positionable between the outlet 112 and the first filter cartridge 200. In a typical arrangement, the second filter cartridge 300 is removably positioned within the air cleaner assembly interior cavity 104, and would typically be considered to be a service component that is removable and replaceable, as desired and/or necessary. In one aspect, the second filter cartridge 300 includes a media pack 302 having an inlet flow face 304 for receiving air from the first filter cartridge 200 and an outlet flow face 306 for delivering filtered air to the outlet 112. In the example shown, the media pack 302 has an obround or racetrack cross-sectional shape. However, other shapes are possible, such as round, oval, and rectangular cross-sectional shapes. In one aspect, the media pack 302 defines an outer perimeter 308 extending between the inlet and outlet flow faces 304, 306. In the example shown, the media pack 302 is formed from pleated media. Suitable media constructions for the media pack 302 are discussed in more detail in the Media Types and Configurations section. In one aspect, the filter cartridge 300 includes a seal member 310 which forms a seal against an interior surface of the housing 302 such that all air passing through the interior cavity must pass through the media pack 302.

Referring to FIGS. 2 and 3, the precleaner assembly 400 is shown as being a two-stage air cleaner assembly, and includes a plurality of separator tube arrangements 402. The precleaner assembly 400 is usable to preclean selected material (contaminant) carried by an air stream into the air cleaner assembly 100, before the air reaches the first filter cartridge 200 positioned therein. Such precleaning generally leads to substantial removal of liquid particulate such as rain water or splashed water, etc. and/or various (especially larger) dust or other particles. In the example shown, contaminants removed by the precleaner assembly 400 can be discharged from the interior cavity 104 though an ejection port 114 extending through the housing 102. In some examples, the precleaner assembly 400 comprises a portion of the access cover 108.

In the example shown, the precleaner assembly 400 comprises two shell or cover components secured to one another: an outer (inlet) cover portion 404 and an inner (outlet tube) cover portion 406. In some applications characterized herein, the components 404, 406 are snap-fit or otherwise secured together, but configured to be separable to facilitate cleaning. However, in some applications of the techniques characterized herein, the two covers or shell components 404, 406 can be secured together during assembly, and not be separable again.

As stated previously, the precleaner assembly 400 can be provided with a plurality of separator tube arrangements 402. As most easily seen at FIG. 3, each of the separator tube arrangements 402 can be provided with an inlet end 402a and an outlet end 402b. Proximate the inlet end 402a, each of the separator tube arrangements 402 is provided with a vane arrangement 402c located within an inlet flow tube 402d that extends in a direction towards the outlet end 402b. As presented, the vane arrangements 402c and inlet flow tubes 402d are integrally formed within the outer cover 404. However, these components may be alternatively provided separately and later attached to the outer cover 404, such as by press-fitting. In the example presented, the inlet inner cover 406 includes a plurality of outlet flow tubes 402e projecting from a tube sheet 402f. Each of the outlet flow tubes 402e projects towards the inlet end 402a and partially receives an inlet flow tube 402d, wherein an annulus or gap 402g exists between the inlet and outlet flow tubes 402d.

The general operation of the precleaner assembly 400, again, is to separate material (contaminant) upon entering into the air cleaner assembly 100 to allow for evacuation through outlet port 114 in the housing 102. This inhibits certain materials from ever reaching the internally received filter cartridge componentry (e.g. filter cartridges 100, 200). In general, each tube 402 operates with a centrifugal separation of contaminant conducted internally. To accomplish this, the air entering the inlet ends 402a, as generally directed into a cyclonic pattern by the vanes of the vane arrangement 402c. Due to this action, contaminants are forced against the inlet flow tubes 402d, into the larger interior volume 412 of the precleaner 400, and then ultimately ejected through port 114. As the inlet ends of the outlet flow tubes 402e are located within the outlet ends of the inlet flow tubes 402c, the contaminants which are able to be separated and forced against the inner walls of the inlet flow tubes 402c are unable to enter the outlet flow tubes 402e. The tube sheet 402f blocks airflow between the inner cover 406 and the downstream portions of the air cleaner assembly 100 such that all air separated by the air separator tubes 402 must be directed through the outlet flow tubes 402e. An exemplary separator tube arrangement usable with the disclosed systems herein is shown and described in PCT International Patent Application Publication Number WO 2016/105560, filed on Dec. 23, 2015, the entirety of which is incorporated by reference herein. Alternative arrangements exist. Other types of precleaners may be used without departing from the concepts herein. For example, a single-vane precleaner may be used of the type disclosed in the U.S. Patent Application Ser. No. 62/673,583 filed on May 18, 2018 and entitled PRECLEANER ARRANGEMENT FOR USE IN AIR FILTRATION METHODS, the entirety of which is incorporated by reference herein.

Referring back to FIG. 1, a scavenge system 450 can be provided that is connected to the scavenge port 114, either directly or indirectly, such as via a duct or adapter. Some operating environments result in the capture of low density particulates within the interior volume 412 of the precleaner that are not easily removable via the ejection port 114 via gravity alone. In the example shown, the scavenge system 450 is configured as scavenge pump 450 and includes an fan or fan 452 driven by a motor 454, for example an electric motor 454. Accordingly, when it is desired to evacuate the interior volume 412, or at least ensure that the interior volume 412 is evacuated, the control system 500, discussed below, can activate the motor 454 to generate a vacuum to pull and discharge the particulates from the interior volume 412. Because the scavenge system 450 includes an independent motor 454, the scavenge system 450 can be operated independently from the operation of the power plant 12 and a vehicle 10 within which the power plant 12 may be mounted. Accordingly, the activation and speed control scavenge system 450 can be controlled to satisfy various parameters that would not be possible with the use of a typical scavenge system.

Figure 13:
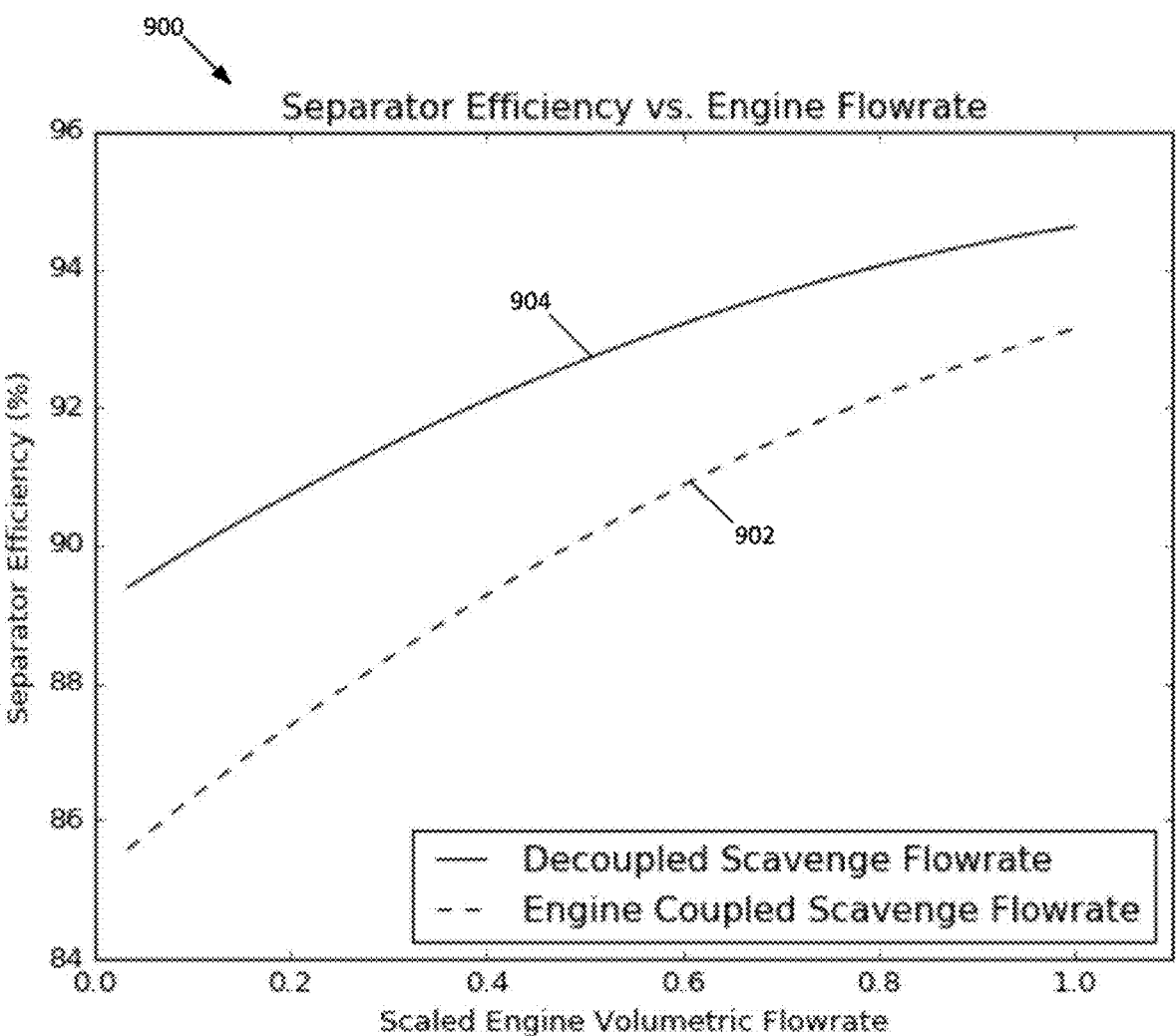
FIG. 13 is a schematic graphical representation showing separator efficiency against engine flow rate for the air cleaner assembly shown in FIGS. 1-3 in comparison to a prior art system.

Referring to FIG. 13, a graphical representation 900 is provided showing a comparison between an air cleaner 100 with a prior art scavenge system (line 902) and an air cleaner 100 with a scavenge system 450 of the present disclosure (line 904) in which separator efficiency, expressed as a percentage, is plotted against volumetric engine flowrate, expressed in unitless scaled form. Generally, scavenge systems are typically designed such that the scavenge flowrate is equal to a constant percentage of the engine flowrate. Such a configuration can be referred to as a coupled system as there is a fixed relationship between engine flowrate and scavenge flowrate. Line 902 represents a coupled system in which the scavenge flowrate is equal to 10% of engine flowrate, where it can be seen that separator efficiency is below 86% at relatively engine low flow rates and peaks at about 93% at maximum engine flowrate with a time averaged separator efficiency of about 88.3%.

In contrast to a coupled system, the flowrate of the scavenge system 450 is controllable independently of engine flowrate. For example, the scavenge system 450 can be controlled to have a relatively higher flowrate at low and middle engine flowrates, in comparison to a coupled system, to increase separator efficiency. Such a configuration may be referred to as a decoupled system. Line 904 represents a decoupled system in which the scavenge system 450 flowrate is calculated as a non-fixed function of the engine flowrate. With such an approach, as is shown as line 904 in FIG. 13, it can be seen that separator efficiency is increased to about 89% at relatively engine low flow rates and peaks at over 94% at maximum engine flowrate with a time averaged separator efficiency of about 91.4%, which represents an increase of 3.1% in time averaged separator efficiency for the disclosed decoupled system. Accordingly, the advantage of the decoupled system over a typical coupled system can be expressed as an increase in minimum separator efficiency, an increase in maximum separator efficiency, and an increase in time averaged separator efficiency.

Figure 14:
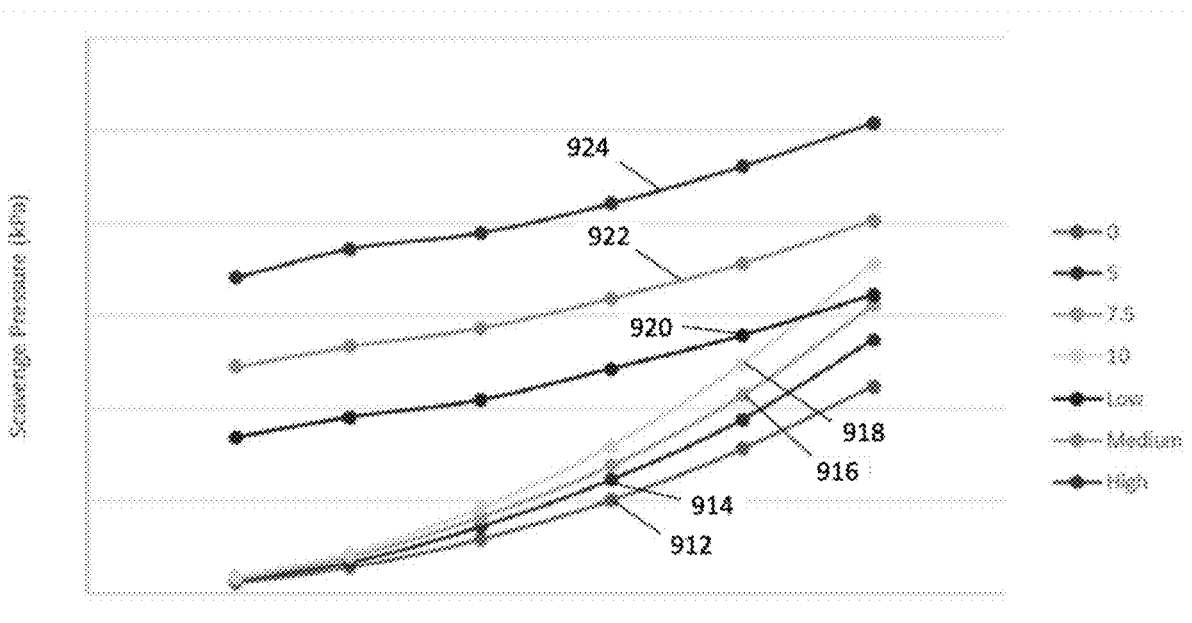
FIG. 14 is a graphical representation showing performance testing of the air cleaner assembly and scavenge system shown in FIG. 13.

Referring to FIG. 14, graphical representations are provided showing actual test results of the air cleaner 100 in various configurations, with and without the scavenge system 450. The graphical representations shows a comparison of scavenge pressure (y-axis) in comparison of flow rate through the air cleaner 100. In general, high scavenge pressures are beneficial in more effectively evacuating the separated particulates from the precleaner. As shown, lines 912 through 918 show test results for the air cleaner 100 without the use of the scavenge system 450, and instead relies upon a prior art scavenge suction pressure that increases in a fixed proportion to airflow through the air cleaner 100. Tests 912 to 918 are performed at a coupled or fixed scavenge percentage, with the scavenge level progressively increasing from test 912 to 914. For each of these tests, it can be observed that the scavenge pressure is near zero at low flowrates, thereby indicating little or no effective scavenging at these flows. Referring to lines 920 to 924, the scavenge system 450 is connected to the air cleaner 100 and operated at a first speed (920), a second speed (922) higher than the first speed, and a third speed (924) higher than the second speed. As can be readily seen at FIG. 14, the scavenge pressures for each of the test speeds with the scavenge pump 450 result in significantly higher scavenge pressures at low system flow rates in comparison to tests not including the scavenge pump 450. These scavenge pressure advantages are carried through the entire operating system flow rates. As mentioned before, the scavenge pump 450 is controllable independently of the main airflow through the air cleaner 100 caused by the power plant 12 and higher levels of scavenge flow can therefore be provided at lower air cleaner flows than is possible using prior art type systems.

Figure 15:
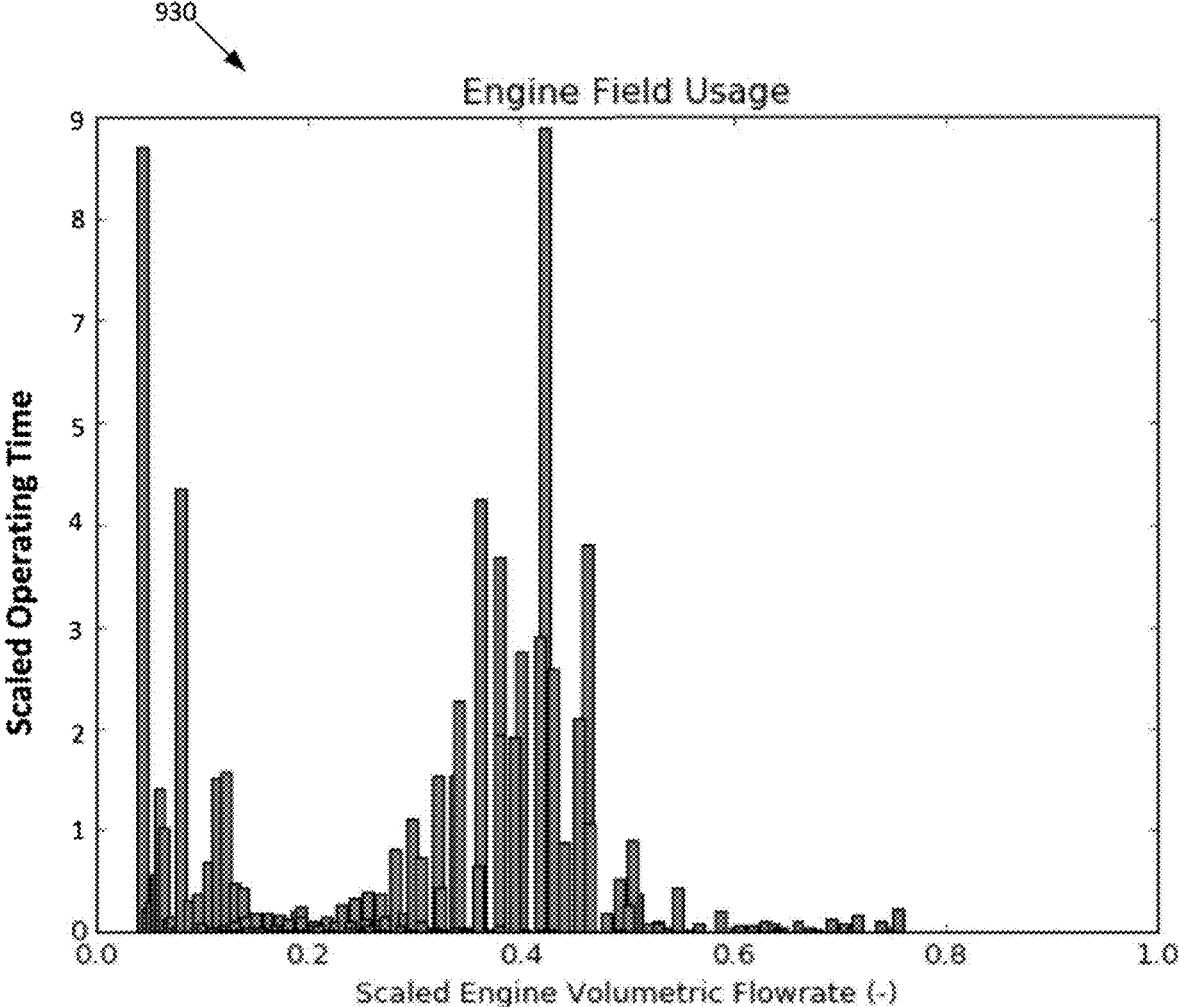
FIG. 15 is a graphical representation showing an example relationship between operating time and engine volumetric flowrate.
Figure 16:
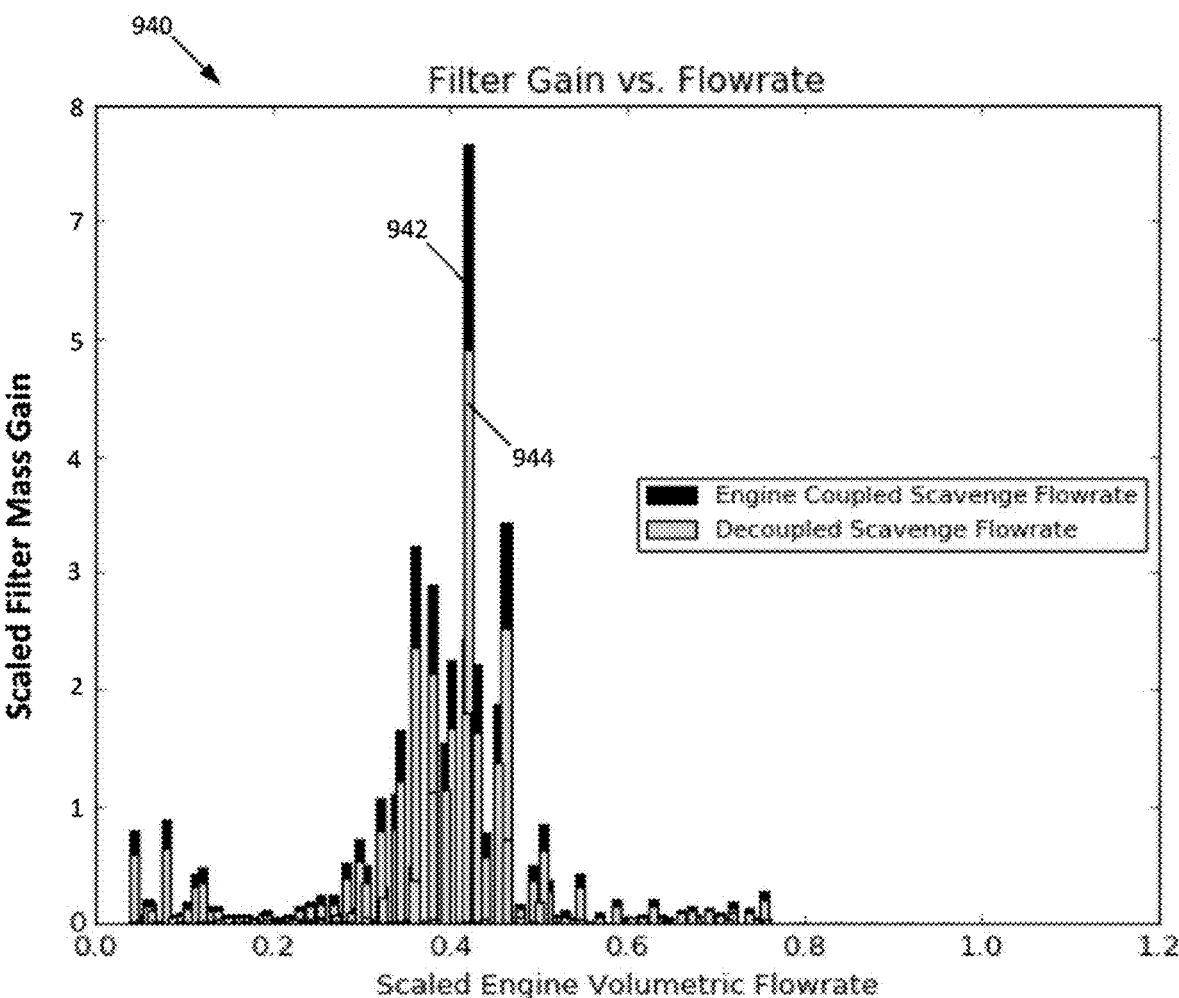
FIG. 16 is a graphical representation showing an example relationship between filter mass gain and engine volumetric flowrate, based on the operational conditions represented in FIG. 15.

As an increase in separator efficiency results in reduced filter loading, a further advantage of a decoupled system over a coupled system can also be expressed as an increase in filter life. This advantage is illustrated in the graph 940 presented at FIG. 16 which shows actual test results of a coupled system 942 and a decoupled system 944 under the operating conditions shown at FIG. 15 is shown. In graph 940, it can be seen that filter mass gain for the decoupled system 944 is less than the filter mass gain for the coupled system 922 at every engine volumetric flowrate with the largest improvements occurring in the middle operating flowrate conditions. As a result, the testing depicted in FIG. 16 shows a 26.3% decrease in filter loading for the decoupled system 944 using scavenge system 450, in comparison to a standard coupled system with a scavenge flowrate set to 10% of the engine flowrate.

Typically, coupled scavenge systems are driven by exhaust flows; as such, the scavenge flowrate has a maximum value for given engine conditions. In comparison, a decoupled scavenge system is free to operate at any conditions based on the inputs provided to it, which offers flexibility to provide optimized system performance, such as filter life, pressure drop, energy consumption, etc. These inputs range from GPS location to various weather-related sensors to determine the optimal performance for the decoupled scavenge system, and are covered in detail in later sections.

Controller 500 and Operational Modes

With continued reference to FIG. 1, the electronic controller 500 is schematically shown as including a processor 500A and a non-transient storage medium or memory 500B, such as RAM, flash drive or a hard drive. Memory 500B is for storing executable code, the operating parameters, and the input from the operator user interface 502 while processor 500A is for executing the code. Memory 500B can also be for storing reference information 500D such as maps and/or lookup tables. The electronic controller is also shown as including a transmitting/receiving port 500C, such as an Ethernet port for two-way communication with a WAN/LAN related to an automation system. A user interface 502 may be provided to activate and deactivate the system, allow a user to manipulate certain settings or inputs to the controller 500, and to view information about the system operation.

The electronic controller 500 typically includes at least some form of memory 500B. Examples of memory 500B include computer readable media. Computer readable media includes any available media that can be accessed by the processor 500A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The electronic controller 500 is also shown as having a number of inputs/outputs that may be used for operating the scavenge system 450. For example, as mentioned previously, the motor 454 can receive an output 504 from the controller 500. Examples of inputs 506 that could be received by the controller 500 are parameters 506a. Parameters 506a may relate to the vehicle 10, the power plant 12, the air cleaner 100, the precleaner 400, or to something else. Examples of parameters 506a are vehicle speed, engine speed, engine or vehicle run time, engine mass flowrate, operator interface signals, vehicle location (e.g. GPS location input via integrated GPS unit or via vehicle GPS unit), a differential pressure signal (e.g. across filter cartridge 100), a water presence signal, a vehicle, engine, or air cleaner assembly vibration signal 506 (e.g. accelerometer input), filter cartridge change or cleaning frequency, filter cartridge identity, engine identity, air flow rate, acoustic levels via an acoustic sensor (use as a proxy for vibration), and/or air quality input via a particulate sensor (e.g. laser real-time optical particle counter). The controller 500 can also include additional inputs and outputs for desirable operation of the scavenge system and related systems. For example, and as shown at FIGS. 1 and 3, the controller 500 can include a first pressure sensor P1 associated with the pressure within the precleaner, a second pressure sensor P2 located between the precleaner and the main filter element 200, a third pressure sensor P3 located between the main filter element 200 and the safety filter element 300, and a fourth pressure sensor P4 located downstream of the safety filter element 300. The controller 500 can also include input signals from the scavenge fan motor 454, for example a speed input signal indicative of an actual rotating speed of the motor 454 and fan 452. Additional input sensors relating to weather data can also be included, such as, temperature sensors, humidity sensors, barometric pressure sensors, moisture or rain sensors, wind direction and velocity sensors, cloud sensors, and/or solar radiation sensors in communication with the controller 500. In some examples, the electronic controller 500 is an independent controller receiving power from a power source 20 that communicates with the vehicle controller 22, for example via the vehicle or CANBUS network. In such cases, additional vehicle information can be utilized by the controller, beyond that already discussed, can be used as inputs to the controller, for example, vehicle fuel economy. In some examples, the vehicle control system serves as the electronic controller 500.

Referring to FIG. 4, an example operational configuration 1000 is shown in which the scavenge fan motor 454 is controlled in a normal operating condition, wherein the speed of the scavenge fan motor 454 is modified or overridden if conditions relating to a minimum operating condition control or if conditions relating to a high operating condition control. Accordingly, and in generalized terms, the scavenge system can be activated in a step 1002 and the scavenge fan motor can be operated in the normal operating mode at 1004. As explained further below, the normal operating mode can be any control approach based on one or more selected parameters. In steps 1006 and 1006, the system monitors for minimum and high operating conditions, respectively. At step 1010, when the condition(s) associated with the minimum operating condition are met, the scavenge motor speed is controlled to the higher of that associated with the minimum and normal operating modes. Similarly, at step 1012, when the condition(s) associated with the high operating condition are met, the scavenge motor speed is controlled to the higher of that associated with the high and normal operating modes. With such an approach, the control of the scavenge system 450 is enhanced by providing minimum and high boundaries on the normal operating condition that can be applied when certain conditions apply.

Figure 5:
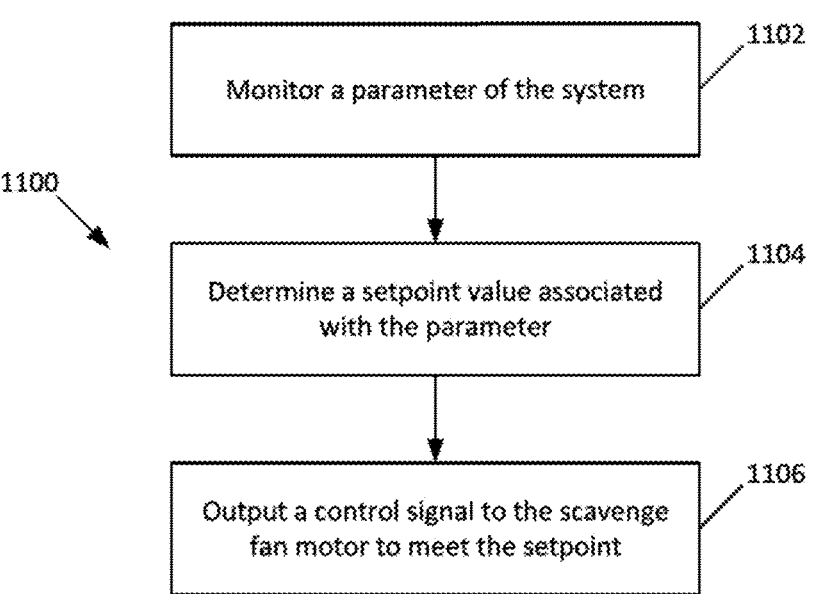
FIG. 5 is a diagram showing a normal operating condition of the control process shown at FIG. 4.

Referring to FIG. 5, a generalized process 1100 is shown in which the normal operating mode includes the monitoring a parameter of the system at 1102, determining a setpoint value associated with the parameter at 1104, and sending a control signal to the scavenge fan motor 454 to meet the setpoint. In one example of a normal operating mode, the speed of the motor 454 is controlled to achieve a scavenge flowrate that is a function of engine flowrate, such as is generally presented at FIG. 6 with process 1200. In normal operating condition 1300, the engine airflow rate is determined at 1202, a fan speed required to achieve a target scavenge airflow rate is calculated at 1204, and a control signal to the scavenge fan motor is sent at 1206. The performance improvements of the decoupled system 450 shown at FIGS. 13 and 16 are based on such an approach. In one example, the scavenge flowrate can calculated as the engine flowrate multiplied by a first constant coefficient a and added to a second coefficient b, which may be expressed, as follows: scavenge flowrate=a×(engine flowrate)+b. In one aspect, the first and second constant coefficients a, b can be derived from operational data and/or characteristics associated with the engine 12 and/or operating environment. Other algorithmic approaches are possible without departing from the concepts presented herein. In one example, operational data includes data relating engine volumetric flow rate to engine operating time, as illustrated in the graph 1100 at FIG. 8. In some examples, operating parameters of the engine 12 can be derived from an established map or look up table 500D or from real time operational data.

In one example of a normal operational configuration, the motor 454 is controlled via an input related to the location of the vehicle or machine (e.g. input 506d). A location input can provide an indication as to the environment within which the vehicle or machine may be present. For example, a location input corresponding to an on-road (e.g. highway) location would provide an indication that the intake air is relatively clean while a location input corresponding to an off-road location would provide an indication that the intake air is relatively full of contaminants. Also, some geographical areas or regions may be associated with air that is relatively higher with contaminants in comparison to other geographical areas or regions. Thus, where a location input is provided indicating a relatively clean environment, the control system can deactivate the scavenge system 454 or operate the scavenge system 454 at a relatively lower speed. Likewise, where a location input is provided indicating a relatively dirty environment, the control system can activate the scavenge system 454 and/or operate the scavenge system 454 at a relatively higher speed. In one example, the location input can used in conjunction with a date input to identify when a climate in a particular area may be associated with higher contaminant levels (e.g. a potentially high-contaminant condition can be identified by correlating a specified geographical area against certain days or months of the year (e.g. to identify high pollen conditions).

Many other implementations and normal operating control configurations are possible. For example, a vehicle speed (e.g. mph via GPS) input and or an engine speed or load input can be used to infer whether a relatively high or low contaminant condition exists. For example, the scavenge system 450 could operate at higher speeds as vehicle speed increases. In one example, an engine speed or load input is used to command the motor 454 off or decrease speed to reduce parasitic losses when the engine is at high load and/or at high speeds. In one example, a differential pressure input can be to infer the current operational condition of the precleaner, the filter cartridge 100, and/or the filter cartridge 200, whereby the motor 454 can be commanded to activate and/or increase speed to clear the precleaner. Additionally, the system can monitor the rate of change of the pressure drop across the filter to identify conditions for modifying scavenge system operation as well. In one example, a moisture or water presence sensor input can be used where the precleaner acts as a water separator. In such a case, the moisture sensor input can be used to set a scavenge flow such that flow through the separator is optimized for water removal. In one example, an air mass flow rate input can be used to modify scavenge flow when air flow rates are high to extend the operating window by reducing pre-cleaner restriction contribution towards end of life. In one example, the air flow rate can be correlated to pressure drop or restriction through the air cleaner such that restriction with respect to flow can be normalized to find the system loss coefficients which can then be monitored for a rate of change to infer the contaminant load coming into the filter, which can then be used to adjust the precleaner bypass flow amount (e.g. low rate of change equals more bypass allowed). In one example, a vibration or accelerometer input can be used to infer the operation condition of the machine or vehicle (e.g. high vibrations can correlate to off-road use and environment while low vibrations can correlate to on-road use and environment and to thus control the operation of the scavenge system 450. Similarly, an acoustic sensor input can be used to estimate vibration for the same purpose. The controller 500 can also monitor the number of installation and removal cycles for the filter cartridge 100 via an input sensor and modify operation of the scavenge system 450 accordingly. The identity of the filter cartridge 100 via an input can also be used to determine the type of filter cartridge installed and thus modify the operation of the scavenge system 450 accordingly. In one example, the input can be an RFID tag on the filter element that is read by the controller 500. The system can also have an input for an air quality sensor to measure particulate levels in the air such that precleaning can be initiated for when high levels of particulate are measured and bypass operation can be initiated during low levels of particulate in the air. An air quality sensor could be used to determine, for example, when a combine is being operated during a harvest operation or a non-harvest operation and accordingly activate and operate the scavenge system 450 only when a harvest operation is occurring. During a non-harvest operation, the scavenge system 450 could be operated at a lower speed or deactivated. An operator input to the system 500, or an input from the harvester itself indicative of a harvesting operation, could also provide an indication that the combine is in a harvest operation.

In some operational configurations, the speed of the scavenge system 450 can be controlled in an incremental or stepped fashion. In one example, the motor 454 can have multiple discrete settings, as set directly by an operator (e.g. "dirty", "mixed", and "clean" settings). The above-described inputs can also be compared against predetermined thresholds set within the controller 500 to select between a fixed number of levels (e.g., "Dirty", "Mixed", "Clean" settings) in order to set the speed and activation of the scavenge system 450. In one example, and in an approach similar to that of Formula 1, the speed of the motor 454 can be calculated based on a formula using the inputs above (e.g., Motor speed %=a*Vehicle Speed-b). Use characteristics of the air cleaner can also be utilized to determine motor speed and trigger levels. For example, precleaner efficiency can be plotted against motor speed and other parameters.

Incremental speed control could also be used to "tune" the total system. For instance, a given on-road truck model may have four different engine options and the possibility of being considered a light duty or a heavy duty (vocational) truck. All of these trucks would still use the same air cleaner and those applications that are more extreme would see a lower performance vs those that have a lighter duty or less severe environment. Having an adjustable scavenge system could level the performance differences and may impact how the air cleaner is design from the start. In such cases, an engine identity input could be used for this determination. In some examples, the speed of the motor 454 is fully controllable such that any motor speed between zero and the maximum speed can be set by the controller 500.

With reference to FIG. 7, an example normal operating condition 1300 is presented in which the pressure within the precleaner is used as a reference for the scavenge fan speed. In normal operating condition 1300, the pressure within the precleaner is determined at 1302, a fan speed setpoint is calculated at 1304, and an output control signal to the scavenge fan motor to meet the fan speed setpoint is sent at 1306. In some examples, the fan speed setpoint is calculated on the basis of ensuring that the scavenge fan generates a differential pressure across the fan that is equal to or exceeds the pressure within the precleaner. With such an approach, the scavenge fan ensures that air cannot undesirably flow in the reverse direction through scavenge port. In some examples, the commanded fan speed includes an additional margin or increment value above the calculated speed required to generate the pressure differential equaling the pressure within the precleaner. For example, the fan speed set point could be set to always be 20% greater than the calculated fan speed. In some examples, the pressure within the precleaner is measured directly, such as could be the case with a direct measurement from the sensor P1. The pressure within the precleaner can also be calculated from the sensor P2 which is located between the precleaner and the main filter element 202. The location of the pressure sensor P2 has been found to be advantageous in that the pressure at this location is relatively unaffected by the operation of the scavenge fan. In contrast, the pressure within the precleaner P1 is necessarily affected by the scavenge fan.

In one example, the pressure within the precleaner is calculated from the pressure at P2 by creating an air cleaner-specific topographical map or maps correlating airflow rates through the air cleaner Qmain to corresponding pressures at P1 and P2 (i.e. a Qmain-P1 map and a Qmain-P2 map). In one particular example, such maps can be created by testing the air cleaner with a closed scavenge tube to determine P1 and P2 and various airflow rates, thereby creating a map enabling P1 to be determined from a reading at P2. Additional maps can also be empirically derived that establish the pressure at P1 and/or P2 at various different flow rates through the air cleaner (Qmain) and through the scavenge port (Qscavenge). In some examples, based on the determined correlations, a map or lookup table can be creating correlating P1 to P2. In some examples, an additional map and/or calculation can be used to correlate the pressure drop (dP) and/or flow (Qscavenge) across the scavenge fan with the output signal to the fan motor, for example a pulse-width-modulating (PWM) signal to the motor. In such a case, a PWM-dP map or lookup table can be created. Other implementations are possible in which the output signal is not a PWM signal. For example, the output signal could be a voltage output, current loop output, frequency output, or digital output, among others. In such cases, a map or lookup table can be created correlating dP to the particular output signal used. In some examples, aforementioned maps or similar maps can be used to derive a transfer function such that the output signal to the scavenge motor can be calculated directly from the P2 input signal. In one example, a transfer function using a PWM output signal for fan speed can be defined, as follows:

F speed=f(P2), wherein:

Fspeed: desired fan speed (RPM)

P2: pressure after the pre-cleaner and before the main element (Pa)

Where the transfer function is provided as a simple linear function, Fspeed can be calculated, as follows:

Fspeed=10 ×P2×5000

In other implementations, a lookup table can be used to determine the PWM output signal speed based on P2. With either approach, because the relationship between PWM and RPM is fan dependent, using an RPM setting can be advantageous in some aspects.

With respect to FIGS. 8 and 9, minimum operating conditions are presented that could be used to override the calculated or determined scavenge fan speed under the normal operating mode. FIG. 8 shows a condition 1400 in which a minimum scavenge fan speed limit value is established, such as a minimum RPM, at 1402, wherein the fan speed is controlled to the minimum RPM where the normal operating mode scavenge flow is less than the minimum RPM at 1404. Such an instance could arise where a signal from a sensor (e.g. P2) that is used to calculate the normal operating mode scavenge fan speed is interrupted or otherwise unavailable. FIG. 9 shows a condition 1500 wherein the scavenge fan minimum speed is determined as a function of maintaining a differential pressure across the fan that is greater than the precleaner pressure with steps 1502-1508 generally similar to those described with respect to FIG. 7. The approach of FIG. 9 could be used where the scavenge fan speed in the normal operating condition is based on another parameter, such as a calculated fraction of the engine flow rate.

Figure 10:
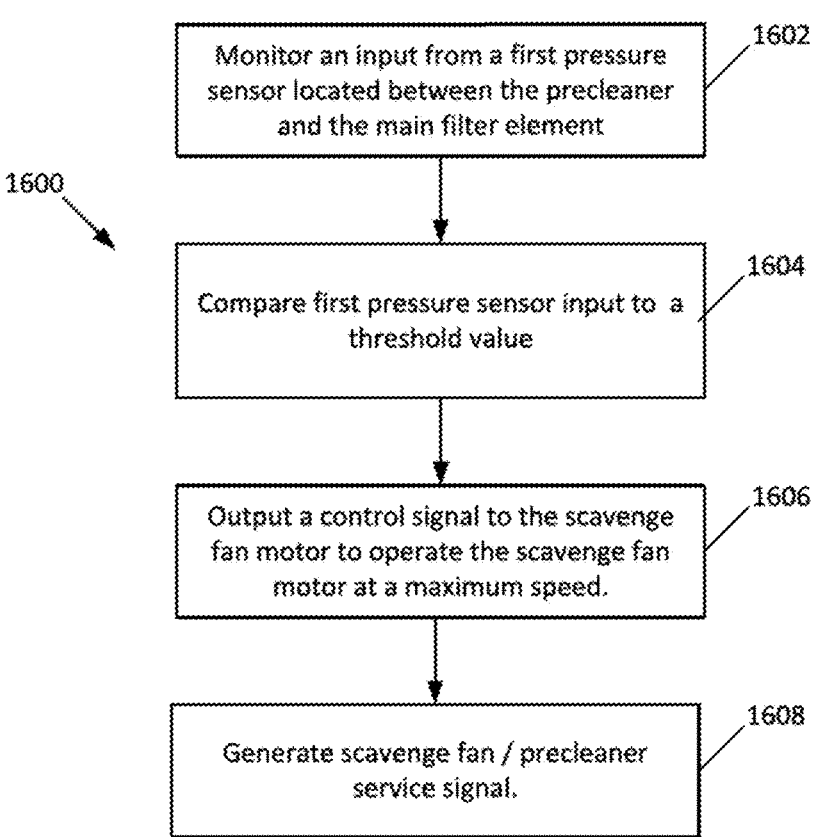
FIG. 10 is a diagram showing an example high operating condition of the control process shown at FIG. 4.

FIG. 10 shows a high operating condition 1600 in which input from a first pressure sensor, such as P2, is monitored at 1602, the input is compared to a threshold value, such as a normal maximum pressure value, at 1604, and an override output to the scavenge fan motor is sent at 1606 where the pressure exceeds the threshold value. Such an instance could arise where the precleaner becomes clogged or where the airflow through the air cleaner is too high. A scavenge fan service signal can be generated at 1608 under such circumstances.

Figure 11:
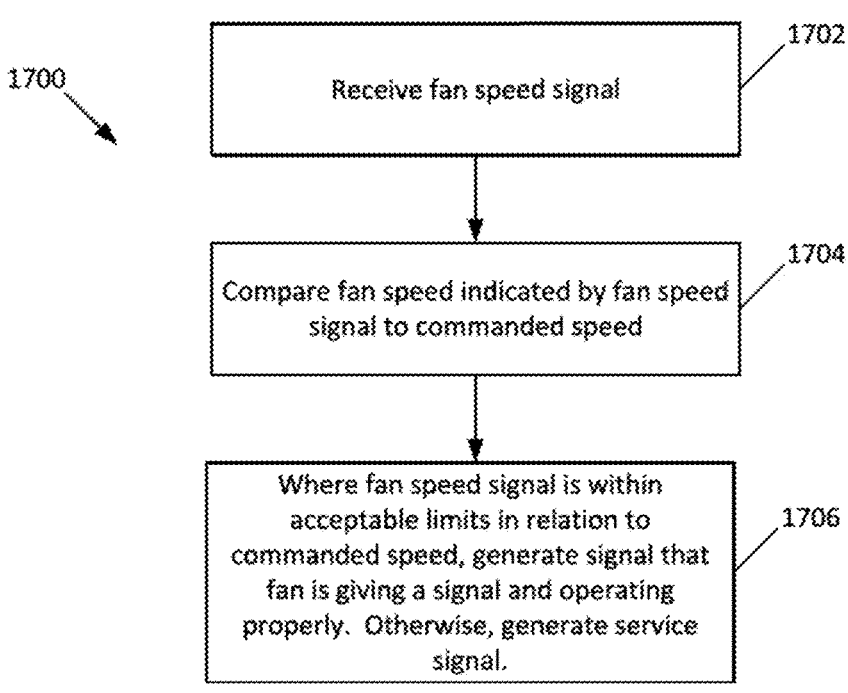
FIG. 11 is a diagram showing an example monitoring process usable with the control process shown at FIG. 4 and the control system shown in FIG. 1.
Figure 12:
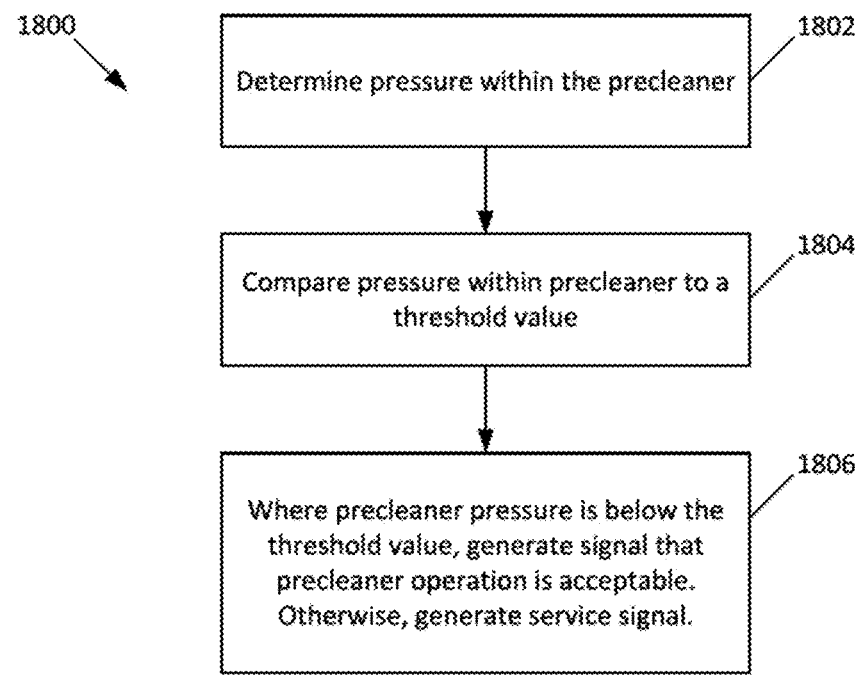
FIG. 12 is a diagram showing an example monitoring process usable with the control process shown at FIG. 4 and the control system shown in FIG. 1.

FIGS. 11 and 12 present monitoring processes 1700, 1800 where additional service signals can be generated, where a potential malfunction is detected. In process 1700, a signal indicating actual fan speed is received from the scavenge fan motor at the controller at 1702. At 1704, the speed signal is compared to the commanded speed for the motor. Where the actual fan speed is within a specified range (e.g. +/−10%) of the commanded speed, the scavenge fan can be assessed as operating satisfactorily. In such instances, a signal can be generated that the fan is giving a signal and operating properly at 1706. Where the actual speed of the scavenge fan falls outside of the range, a service signal can be generated at 1706. In an alternative approach, for example where the output to the scavenge fan is not a speed command signal, the controller can use the command signal to calculate a fan speed for comparison against the actual fan speed signal. Also, the system can be configured to determine the power consumption of the fan motor required to reach a certain speed and make a comparison to corresponding values relating to a healthy, new, and/or unworn fan condition. Where the power consumption for a given speed falls outside of acceptable limits (i.e. a specified threshold and/or range), a service signal can be generated. In general terms, the scavenge fan speed will increase in speed over time to maintain the same airflow or pressure drop as the debris being exhausted by the scavenge fan erodes the fan blades over time. Accordingly, these approaches provide a valuable diagnostic tool for identifying when the scavenge fan may be nearing the end of its useful service life prior to failure such that servicing can be performed in a timely fashion without undue downtime. In some examples, the scavenge fan is configured to be a relatively inexpensive service component that is easily removable and replaceable, as desired and/or necessary. In some examples, the scavenge fan is configured as a more integral part of the air cleaner and is configured in a more robust fashion with the intention that the fan will have a longer service life over which the fan is maintained through maintenance efforts.

Process 1800 at FIG. 12 shows steps 1802-1806 whereby the pressure within the precleaner is compared to a threshold value, for example, a threshold value corresponding to the maximum anticipated pressure within the precleaner under normal operating conditions. Where the pressure within the precleaner is below the threshold value, a signal can be generated that precleaner operation is acceptable. Where the pressure within the precleaner is above the threshold value, a signal can be generated that the precleaner should be serviced.

In some examples, the controller 500 and/or the vehicle control system in communication with the controller 500 can be configured with a wireless receiver/transmitter 500C for to enable remote communication between the controller 500 and other systems. With such a configuration, the controller 500 can be adapted to receive additional information or data for controlling the scavenge system 450. In one example, the controller 500 can be configured to receive real-time and forecast weather data weather data APIs via the cloud 600, and then operate the scavenge system 450 during weather and atmospheric conditions corresponding to high particulate matter or lower air quality conditions (e.g. low pollen, dust, etc.). However, and as related previously, atmospheric or weather conditions can be also be assessed from local sensors onboard the vehicle. For example, atmospheric or weather conditions can be determined via input from temperature sensors, humidity sensors, barometric pressure sensors, moisture or rain sensors, wind direction and velocity sensors, cloud sensors, and/or solar radiation sensors in communication with the controller 500. In some examples, locally received atmospheric and weather data (via sensors) and remotely received atmospheric and weather data may be used by the controller 500 to control the scavenge system 450.

In one aspect, the wireless receiver/transmitter 500C can also be placed in communication with a remote system 700 (e.g. a server 700A and database 700B) which can be configured to perform some or all of the aforementioned logic functions previously ascribed to the controller 500. The controller 500 can also send current or recorded operational data to the remote system 700 for archiving. The controller 500 and remote system 700 can also be configured to allow for control algorithms stored on the controller 500 to be implemented and/or updated via the remote server 700. In one example, the remote system 700 can be placed in communication with multiple controllers 500 such that the performance of multiple systems can be simultaneously monitored and evaluated. The remote system 700 can use individual or aggregated controller data to optimize the control algorithms and/or operational set points used by the controller(s) 500. In one example implementation, a fleet operator can develop an operation policy which is pushed out to the controllers 500 of all vehicles within the fleet via the remote system 700. One example policy would be that the scavenge system 450 is to be set to a default mode or setting for all vehicles until the bypass mode is overridden. The policy can include instructions for the controller to override the default mode under certain conditions (e.g. as previously described) and/or can include a remote override that enables the fleet operator to selectively place the scavenge system into a different mode based on the identification of a certain condition (e.g., forecast dust storm, change in the use of fleet vehicles to a more dusty environment, etc.). The remote system 700 can also be configured to provide a fleet owner with the current operating status of each scavenge system associated with a vehicle and to provide the fleet owner with the ability to directly override the commanded position of the scavenge system 450 by the controller 500.

Media Types and Configurations

Any type of filter media can be used as the media pack for the filter cartridges 100, 200 in accordance with embodiments of the invention. For example, woven and non-woven materials using natural and/or synthetic fibers can be used to form fluted filter media, pleated media, and depth media. An exemplary configuration includes fluted filter media, such as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of filter media are provided in U.S. Pat. Nos. 5,820,646; 5,772,883; 5,902,364; 5,792,247; 5,895,574; 6,210,469; 6,190,432; 6,350,296; 6,179,890; 6,235,195; D399,944; D428,128; D396,098; D398,046; and D437,401, each of which is incorporated herein by reference.

One type of z-filter media utilizes two specific media components joined together to form the media construction. The two components include a fluted (typically corrugated) media sheet and a facing media sheet. The facing media sheet is typically non-corrugated, although it is possible for it to also be corrugated (e.g., perpendicular to the flute direction) as described in U.S. Provisional Application No. 60/543,804, filed Feb. 11, 2004, and published as PCT WO 05/077487 on Aug. 25, 2005, which is incorporated herein by reference.

The fluted media sheet and the facing media sheet are used together to define media having parallel inlet and outlet flutes. In some instances, the fluted sheet and facing sheet are secured together and are then coiled as a media strip to form a z-filter media construction. Such arrangements are described, for example, in U.S. Pat. Nos. 6,235,195 and 6,179,890, each of which is incorporated herein by reference.

In certain other arrangements, some non-coiled sections or strips of fluted (typically corrugated) media secured to facing media, are stacked with one another, to create a filter construction.

Corrugated media is a specific form of fluted media, wherein fluted media has individual flutes or ridges (for example formed by corrugating or folding) extending there-across. The term "corrugated" is used herein to refer to structure in media, such as media having a flute structure resulting from passing the media between two corrugation rollers (e.g., into a nip or bite between two rollers, each of which has surface features appropriate to cause corrugations in the resulting media).

Serviceable filter element or filter cartridge configurations utilizing z-filter media are sometimes referred to as "straight through flow configurations" or by variants thereof. In general, serviceable filter elements or cartridges have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner.

It is noted that a plurality of embodiments are depicted and described. The embodiments are not meant to be exclusive with respect to features depicted. That is, selected features of one embodiment can be applied in one or more of the other embodiments if desired, to advantage. In many examples, the filter assembly depicted is an air cleaner assembly, for example, used to filter intake air for an internal combustion engine. Additional applications are possible, for example, applications in which the filter assembly is a crankcase ventilation filter assembly, in which the filter cartridge is used to filter crankcase blowby gases which include, typically, both particulate and liquid contaminant therein. Both type of filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. An air cleaner assembly for filtering intake air for a power plant, the air cleaner assembly comprising:
   a) a filter cartridge disposed within a housing of the air cleaner assembly;
   b) a precleaner assembly including at least one particle separator for separating particulates from an airflow stream and a scavenge port for discharging the separated particulates, the precleaner assembly being located upstream of the filter cartridge;
   c) a scavenge system for evacuating the separated particulates out of the scavenge port, the scavenge system including a motor coupled to a fan; and
   d) a controller varying a speed of the scavenge system motor in a normal operating mode in which the speed is a function of an input signal relating to one or more operational parameters associated with the precleaner assembly, the air cleaner assembly, the power plant receiving air from the air cleaner assembly, and/or a vehicle associated with the power plant;

e) wherein the controller includes one or both of a minimum operating condition and a high operating condition, wherein the controller automatically overrides an output to the scavenge system motor to a different speed when one or more parameters associated with either of the minimum and the high operating conditions are met.

2. The air cleaner assembly of claim 1, wherein the minimum operating condition includes a parameter associated with a minimum pressure within the precleaner assembly or a minimum rotational speed setpoint of the scavenge system motor.

3. The air cleaner assembly of claim 1, wherein the high operating condition includes a parameter associated with a maximum pressure within the precleaner assembly.

4. The air cleaner assembly of claim 1, wherein the controller includes both the minimum operating condition and the high operating condition, wherein the controller overrides the output to the scavenge system motor to a different speed when one or more parameters associated with the minimum operating condition is met and when one or more parameters associated with the high operating condition is met.

5. An air cleaner assembly for filtering intake air for a power plant, the air cleaner assembly comprising:
    a) a filter cartridge disposed within a housing of the air cleaner assembly;
    b) a precleaner assembly including at least one particle separator for separating particulates from an airflow stream and a scavenge port for discharging the separated particulates, the precleaner assembly being located upstream of the filter cartridge;
    c) a scavenge system for evacuating the separated particulates out of the scavenge port, the scavenge system including a motor coupled to a fan;
    d) a controller varying a speed of the scavenge system motor in a normal operating mode in which the speed is a function of an input signal relating to one or more operational parameters associated with the precleaner assembly, the air cleaner assembly, the power plant receiving air from the air cleaner assembly, and/or a vehicle associated with the power plant; and
    e) a first pressure sensor arranged to sense a pressure between the precleaner assembly and the filter cartridge, wherein the controller receives an input from the first pressure sensor and sends an output signal to the scavenge system motor based on the input;
    f) wherein the controller includes one or both of a minimum operating condition and a high operating condition, wherein the controller overrides the output signal to the scavenge system motor to a different speed when parameters associated with either of the minimum and the high operating conditions are met.

6. The air cleaner assembly of claim 5, wherein the controller determines the pressure within the precleaner assembly based on the sensed pressure at the first pressure sensor.

7. The air cleaner assembly of claim 6, wherein the controller includes a transfer function for determining the pressure within the precleaner assembly based on the sensed pressure at the first pressure sensor.

8. The air cleaner assembly of claim 7, wherein the transfer function includes a first correlation between an air mass flow rate through the precleaner assembly and the pressure within the precleaner assembly and a second correlation between the air mass flow rate through the precleaner assembly and the pressure between the precleaner assembly and the filter cartridge.

9. The air cleaner assembly of claim 5, further including a second pressure sensor arranged to sense the pressure within the precleaner assembly and providing an input to the controller.

10. The air cleaner assembly of claim 5, wherein the controller operates the scavenge system motor at a maximum operational speed when the pressure sensed at the first pressure sensor exceeds a threshold value.

11. The air cleaner assembly of claim 10, wherein, when the pressure sensed at the first pressure sensor exceeds the threshold value, the controller sends an output service signal associated with the precleaner assembly.

12. The air cleaner assembly of claim 5, wherein the output signal to the scavenge system motor is a rotational speed control signal.

13. The air cleaner assembly of claim 12, wherein the rotational speed control signal is a pulse-width-modulating (PWM) signal.

14. The air cleaner assembly of claim 13, wherein the controller includes a first map correlating the PWM signal to the pressure drop across the scavenge system.

15. The air cleaner assembly of claim 14, wherein the controller includes one or more pressure mapping curves correlating a scavenge fan PWM signal, a flow rate through the scavenge system, and a pressure signal at the first pressure sensor.

16. The air cleaner assembly of claim 15, wherein the controller includes a transfer function generating the scavenge system motor speed output PWM signal from the first pressure sensor input, wherein the transfer function is derived from the first map and the one or more pressure mapping curves.

17. The air cleaner assembly of claim 15, wherein the controller includes a minimum rotational speed set point value below which the scavenge system motor is not operated.

* * * * *